Nov. 20, 1928.  
J. E. McLAUGHLIN  
1,692,680  
MACHINE FOR FORMING GLASS ARTICLES  
Filed Oct. 19, 1927  
2 Sheets-Sheet 2
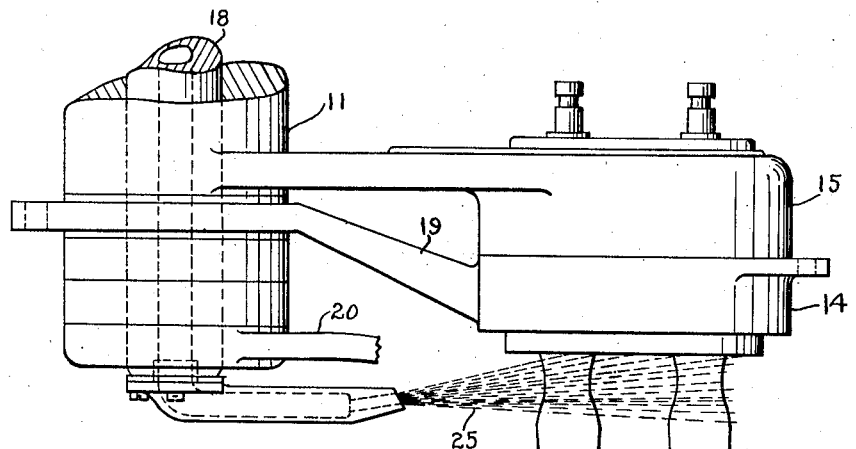
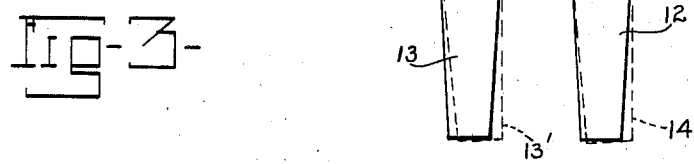
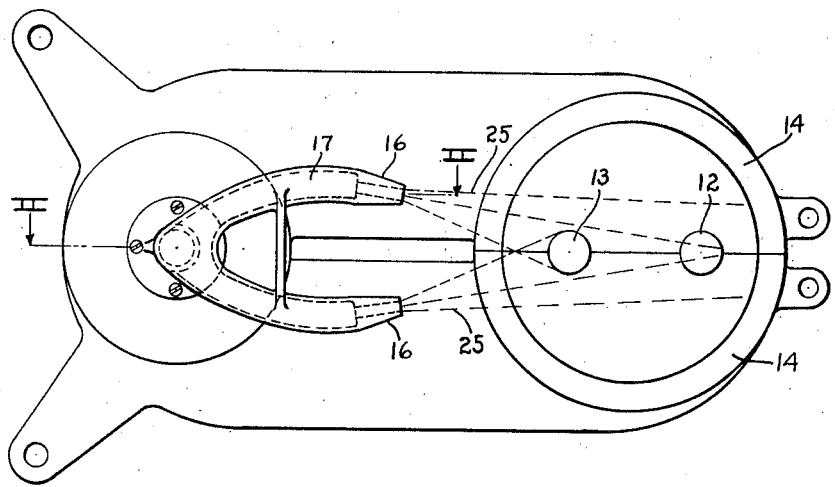
Inventor  
John E. McLaughlin  
By J. F. Rule,  
Attorney Patented Nov. 20, 1928.

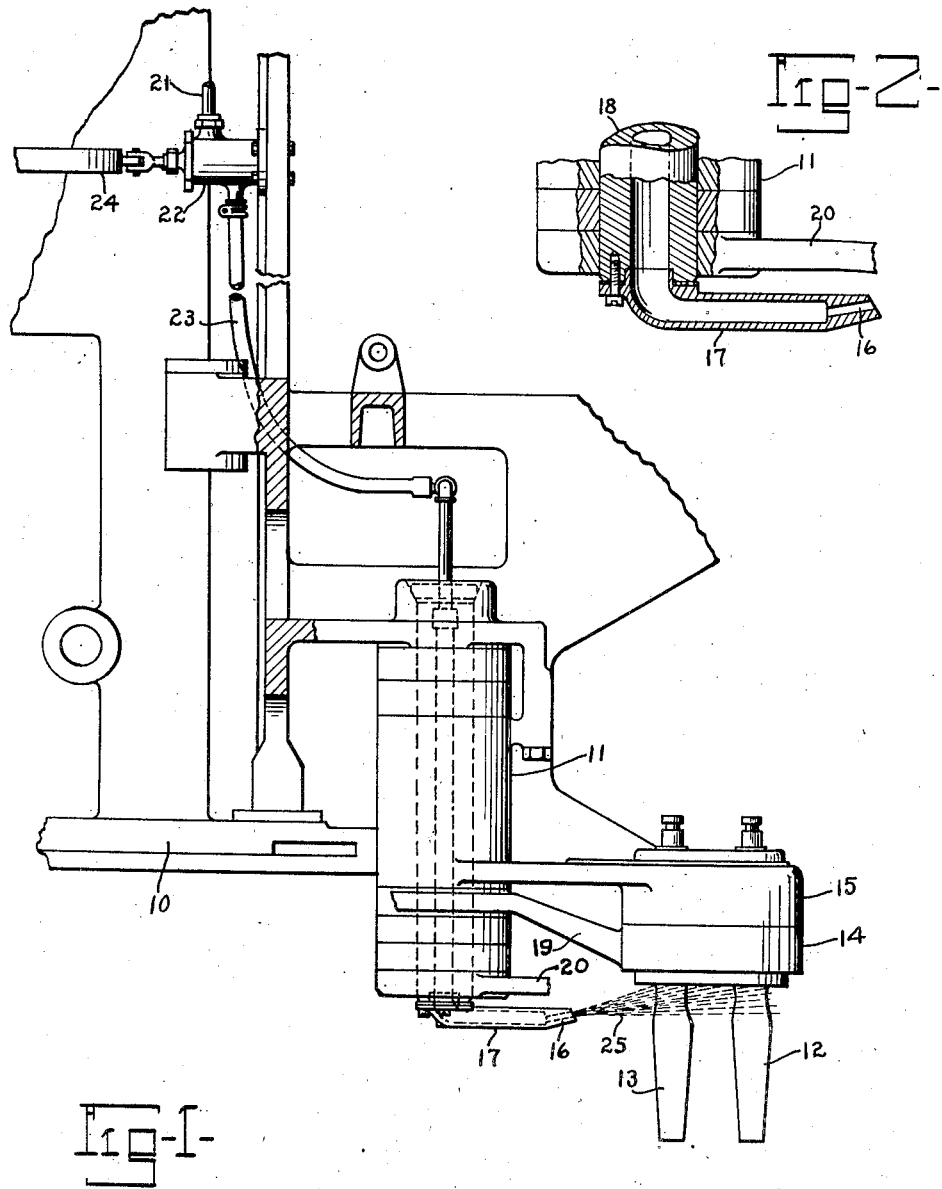

1,692,680

UNITED STATES PATENT OFFICE.

JOHN E. McLAUGHLIN, OF TOLEDO, OHIO, ASSIGNOR TO THE OWENS BOTTLE COMPANY, OF TOLEDO, OHIO, A CORPORATION OF OHIO.

MACHINE FOR FORMING GLASS ARTICLES.

Application filed October 19, 1927. Serial No. 227,092.

My invention relates to machines for forming glass articles and particularly to means for directing blasts of cooling air against suspended parisons of plastic glass for the purpose of counteracting or correcting the tendency of the parisons to be swung out of a true vertical position, owing to a one sided chilling or other causes.

The construction embodying the present invention is a modification of that disclosed in the patent to Richard La France, Number 1,299,482, April 8, 1919, to which reference may be had for a fuller disclosure of the general purpose and operation of cooling means used for a like purpose, and also for a more detailed description of the type of machine to which the present invention is herein shown as applied.

My invention as herein disclosed is designed for applying cooling air simultaneously to a plurality of suspended parisons and, more particularly, is adapted to a machine in which the suspended parisons are arranged with their axes in a plane radial to the rotating mold carriage on which they are mounted.

In the accompanying drawings:

Fig. 1 is an elevation view of a portion of the machine to which my invention is applied.

Fig. 2 is a section through one of the nozzles, the section being taken at the line II—II on Fig. 4.

Fig. 3 is an elevation showing the suspended parisons and a cooling nozzle.

Fig. 4 is a bottom plan view of the same.

The invention is herein illustrated as applied to a suction gathering machine of the Owens type which comprises a mold carriage or frame 10 rotatable continuously about a vertical axis and on which are mounted a plurality of heads or units 11 each carrying a set of molds.

The suspended parisons 12 and 13 of plastic glass are formed in the usual manner in a blank mold (not shown) which then opens, leaving the parisons suspended from the neck mold 14 beneath the blowing head 15. Blasts of cooling air are directed against the parisons from nozzles 16 formed at the free ends of a hollow U-shaped blowing head 17. Said head is attached to the lower end of a hollow vertical shaft 18 on which are pivotally mounted the arms 19 carrying the neck mold sections, and arms 20 carrying the blank mold sections. Air under pressure is supplied through a pipe 21 in continuous communication with a supply of air under pressure. The pipe 21 is connected to a valve 22 from which extends an air line 23 communicating through the hollow shaft 18 with the blowing head 17. The valve 22, which is mounted on the rotating mold carriage, is periodically actuated by a stationary cam 24 to supply air intermittently to the blowing head in the manner set forth in the patent above mentioned.

It will be noted that the parisons 12 and 13 are arranged radially of the mold carriage. That is to say, the vertical axes of the two parisons are in a vertical plane radial to the axis about which the mold carriage rotates. The nozzles 16 which are positioned on opposite sides of said plane are arranged to throw jets of air 25 in convergent directions. These convergent jets or blasts of air meet in said vertical plane so as to form a blast or current of air moving in a direction radially outward from the center of the machine, so that the cooling effect is mainly on the inner sides of the parisons, that is, the sides toward the center of the machine. It will be observed that the positions of the nozzles 16 are such that each nozzle directs its cooling air against both parisons. The effect of this air is to counteract the tendency of the parisons to swing outwardly to the dotted line positions 13' and 14' out of vertical alignment.

Modifications may be resorted to within the spirit and scope of my invention.

What I claim is:

1. In a glass forming machine, the combination of means for suspending a parison of glass while in a plastic condition, and means for directing cooling air against one side of the parison comprising a plurality of air nozzles arranged to direct blasts of air in convergent directions such that said air blasts are united in a stream of air directed against one side of the parison.

2. In a glass forming machine, the combination of a rotary mold carriage, means on the carriage for suspending a bare parison of plastic glass, a blowing head mounted on the carriage intermediate said axis and said parison, said head comprising convergent air nozzles, and means for supplying air under pressure to said head and causing air blasts from said nozzles to unite in a stream of air directed against the side of the parison nearest the axis of the mold carriage.

3. In a glass forming machine, the combination of means for suspending a bare parison of plastic glass, a blowing head comprising nozzles arranged to direct blasts of air in convergent directions, said head being so positioned that the air is directed mainly against one side of the parison.

4. In a glass forming machine, the combination of a mold carriage, a hollow vertical shaft thereon, a neck mold comprising separable sections mounted to swing about the axis of said shaft, a blowing head mounted on the lower end of said shaft, said head comprising a plurality of nozzles arranged to direct blasts of air in convergent directions against a parison suspended from the neck mold, and means for supplying air under pressure through said hollow shaft to the blowing head.

5. In a machine for forming glass articles, the combination of a mold carriage rotatable about a vertical axis, means for forming and suspending parisons of plastic glass one in advance of another in a direction radially of the mold carriage, and air nozzles arranged on opposite sides of a line extending from said axis to said parisons and arranged to direct convergent blasts of air against the parisons.

6. In a machine for forming glass articles, the combination of a mold carriage rotatable about a vertical axis, means for forming and suspending parisons of plastic glass one in advance of another in a direction radially of the mold carriage, and a blowing head arranged at a position intermediate said axis and said parisons, said head comprising air nozzles arranged to direct converging blasts of air toward the parisons and cause said air blasts to unite in a stream of air moving substantially radially outward against the sides of the parisons nearest the axis of the mold carriage.

Signed at Toledo, in the county of Lucas and State of Ohio, this 15th day of October, 1927.

JOHN E. McLAUGHLIN.